Jan. 17, 1933.    E. HUNZIKER    1,894,273
ELECTRIC MACHINE ROTOR
Filed Dec. 2, 1931
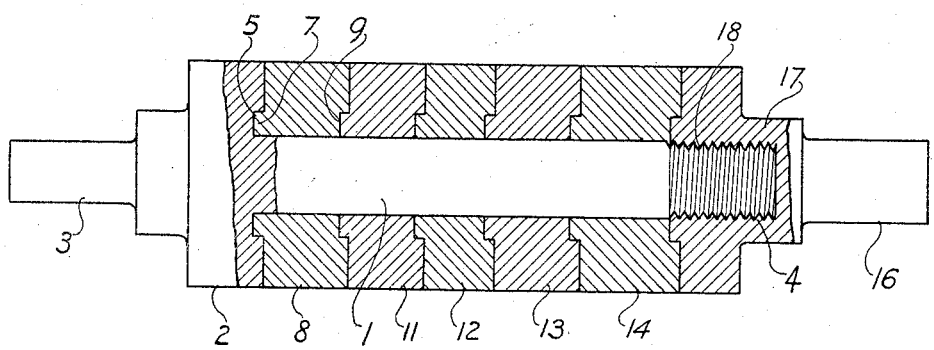
Inventor
Emil Hunziker
By Alfred H. Dyson
Attorney Patented Jan. 17, 1933

1,894,273

UNITED STATES PATENT OFFICE

EMIL HUNZIKER, OF BADEN, SWITZERLAND, ASSIGNOR TO AKTIENGESELLSCHAFT BROWN, BOVERI & CIE., OF BADEN, SWITZERLAND, A JOINT STOCK COMPANY OF SWITZERLAND

ELECTRIC MACHINE ROTOR

Application filed December 2, 1931, Serial No. 578,475, and in Germany August 4, 1930.

An application has been filed in Germany August 4, 1930, and an application in Belgium October 28, 1930.

This invention relates to improvements in inductor or rotor members particularly adaptable for high speed electric machines for large loads.

It has been found that the manufacture of the rotor members for high speed electric machines of high load is facilitated if the rotor is divided into several portions, which, being relatively small, may be more readily forged than a single massive member. Such rotor member portion must however be so joined as to act as an integral member to avoid danger of breakages.

It is, therefore, among the objects of the present invention to provide an inductor member for large high speed electric machines in which the rotor or inductor member is made up of a plurality of sections.

Another object of the invention is to provide an inductor member for high speed machines of large load in which the inductor member is made up of a plurality of interlocked discs clamped between a flange integral with one end of a shaft and a flanged member screw-threaded on the other end of the shaft.

Objects and advantages, other than those above set forth, will be apparent from the following description when read in connection with the accompanying drawing, which illustrates one embodiment of the invention, shown partially in longitudinal section.

Referring more particularly to the drawing by characters of reference, the numeral 1 designates a shaft having a flange 2 formed integral therewith and having the one end thereof formed to provide a portion 3 adapted to rotate in a suitable bearing (not shown). The other end of the shaft 1 is formed with a screw-thread 4, the purpose of which will appear hereinafter. The flange 2 is formed with a groove 5 therein which is arranged to receive an annular extension 7 of a disc 8 likewise having a groove 9 therein on the side thereof opposite the extension 7. The disc 8 is formed with a central aperture of such size as to fit closely on the shaft 1 when the disc is pressed into engagement with the flange 2 and the extension 7 of the disc 8 is formed to fit closely into the groove 5 of flange 2. A plurality of discs 11, 12, 13 and 14, similar in all respects to disc 8, are arranged in interlocking engagement on the shaft 1, the number of the discs being sufficient to utilize the full length of the shaft from the flange 2 to the screw-thread 3 thereon. The discs are pressed tightly together by means of a bearing member 16 having a flange 17 formed integral therewith to fit into close engagement with disc 14. The flange 17 is tapped to provide the screw-thread 18, for receiving the screw-threaded end of the shaft 1, as shown.

All of the discs are thus clamped between the end flanges 2 and 17 upon screwing up of end member 16 on shaft 1. The interlocking grooves and extensions formed on the flanges and on the discs so increase the rigidity of the entire structure, that the shaft 1 may be made hollow if desired. All of the portions of the rotor structure shown may readily be forged or otherwise formed to secure a homogeneity in the several portions thereof, which would be extremely difficult to secure in a unitary structure of the same size. It will be apparent, of course, that the discs may be shrunk on the shaft to secure greater rigidity of the structure if desired. Furthermore, it is proposed to increase the force, by which the discs are clamped between the end members, by shrinking the shaft 1 in an axial direction.

Although but one embodiment of the present invention has been illustrated and described, it will be apparent to those skilled in the art that various modifications and changes may be made therein without departing from the spirit of the invention or from the scope of the appended claims.

Another form of the invention pertaining to a plurality of disc-shaped forgings arranged freely beside one another on a shaft but without axial play and held together by pressure, consists in the discs which form the middle portion of the inductor member being clamped together by shrinking the shaft in an axial direction.

The invention claimed is:

1. A rotor for electric machines comprising a shaft having a flange adjacent one end thereof and being screw-threaded at the other end thereof, a plurality of discs arranged on said shaft, and a flanged end member engaging the threaded end of said shaft to clamp said discs against the flange on said shaft.

2. A rotor for electric machines comprising a shaft having a flange formed integral therewith adjacent one end thereof and being screw-threaded at the other end thereof, a plurality of discs arranged on said shaft, and a hollow flanged end member interiorly screw-threaded and engaging the threaded end of said shaft to clamp said discs against the flange on said shaft.

3. A rotor for electric machines comprising a shaft having a flange adjacent one end thereof and being screw-threaded at the other end thereof, a plurality of discs arranged on said shaft, said discs and the flanges having grooves therein and extensions thereon to secure engagement of said discs with each other and with the flanges, and a flanged end member engaging the threaded end of said shaft to clamp said discs against the flange on said shaft.

4. Rotor structure of the character described comprising end members having a screw-threaded connection with each other and each provided with a stub shaft, and a member intermediate said end members and clamped between the same.

5. Rotor structure of the character described comprising end members each provided with a stub shaft, and a plurality of centrally-apertured members intermediate said end members, one of said end members being provided with a shaft extending through said intermediate members and screw-threaded into the other end member whereby said intermediate members are clamped between said end members.

6. Rotor structure of the character described comprising end members each provided with a stub shaft and with a flange, and a plurality of centrally-apertured members intermediate said end members, one of said end members being provided with a shaft extending through said intermediate members with a close fit and being screw-threaded into the other end member whereby said intermediate members are clamped between said end members, certain of said members having an interlocking connection with each other at their adjacent faces.

In testimony whereof I have hereunto subscribed my name this 17 day of July A. D. 1931.

EMIL HUNZIKER.